(12) United States Patent
Winborn (10) Patent No.: US 9,061,223 B2
(45) Date of Patent: Jun. 23, 2015

(54) MULTI-PORT VALVE DEVICE WITH DUAL DIRECTIONAL STRAINER

(71) Applicant: Craig V. Winborn, Odessa, TX (US)

(72) Inventor: Craig V. Winborn, Odessa, TX (US)

( * ) Notice: Subject to any disclaimer, the term of this patent is extended or adjusted under 35 U.S.C. 154(b) by 0 days.

(21) Appl. No.: 14/520,017

(22) Filed: Oct. 21, 2014

(65) Prior Publication Data

US 2015/0034185 A1 Feb. 5, 2015

Related U.S. Application Data

(60) Provisional application No. 62/049,553, filed on Sep. 12, 2014.

(51) Int. Cl.
| | |
|---|---|
| *F16K 11/20* | (2006.01) |
| *B01D 29/92* | (2006.01) |
| *B01D 35/02* | (2006.01) |
| *B01D 46/00* | (2006.01) |
| *F16K 27/06* | (2006.01) |

(52) U.S. Cl.
CPC ............ *B01D 29/92* (2013.01); *B01D 46/0039* (2013.01); *Y10T 137/794* (2015.04); *B01D 35/02* (2013.01); *F16K 11/20* (2013.01); *F16K 27/06* (2013.01)

(58) Field of Classification Search
CPC ........ F16K 11/20; B01D 35/02; B01D 29/92; B01D 2313/105; B01D 2313/125
USPC ..................... 137/549, 561 A, 883, 887, 861; 210/439, 445, 451, 477, 456
See application file for complete search history.

(56) References Cited

U.S. PATENT DOCUMENTS

| | | | | |
|---|---|---|---|---|
| 2,610,741 | A | * | 9/1952 | Schmid .......................... 210/309 |
| 2,661,096 | A | * | 12/1953 | Tinker ........................... 210/308 |
| 3,748,837 | A | * | 7/1973 | Billeter .......................... 55/418 |
| 4,051,042 | A | * | 9/1977 | Tullier et al. .................. 210/409 |
| 4,836,238 | A | * | 6/1989 | Wright et al. ............. 137/315.08 |
| 5,230,366 | A | * | 7/1993 | Marandi ....................... 137/613 |
| 5,433,243 | A | * | 7/1995 | Griswold et al. ............. 137/498 |
| 6,390,446 | B1 | * | 5/2002 | Wang ............................ 251/148 |

(Continued)

OTHER PUBLICATIONS

Neptune Bulletin FDP/CFS-08 (Published 2008).*

*Primary Examiner* — Atif Chaudry
(74) *Attorney, Agent, or Firm* — Sarah Hegi Simpson; McWhorter, Cobb & Johnson, LLP (57) ABSTRACT

A multi-port valve device with a dual directional strainer is disclosed herein. The disclosed valve device generally comprises a body including a cylindrical wall, the body having a front face, a rear face, a top face, and a bottom face; a first arm including a cylindrical wall, wherein the first arm is attached to the rear face of the body and extends perpendicularly from the rear face of the body; a second arm including a substantially cylindrical wall, wherein the second arm is attached to the bottom face of the body and extends obliquely from the bottom face of the body; a fluid passageway extending through the cylindrical walls of the first arm and the body; and a strainer member at least partially disposed within the second arm, the strainer member being arranged and configured to strain fluids flowing through the fluid passageway from the first arm through the strainer member and into the body in a first direction and to strain fluids flowing from the first arm through the strainer member and into the body in a second direction, the second direction being opposite of the first direction. The disclosed valve device may be utilized to fluidly connect a tank to an injection pump and to a gauge.

17 Claims, 9 Drawing Sheets

(56) References Cited

U.S. PATENT DOCUMENTS

| | | | |
|---|---|---|---|
| 6,719,900 B2* | 4/2004 | Hawkins | 210/248 |
| 2006/0065319 A1* | 3/2006 | Csitari | 137/887 |
| 2010/0018911 A1* | 1/2010 | VanZeeland | 210/86 |
| 2013/0240042 A1* | 9/2013 | Persson et al. | 137/1 |

* cited by examiner

MULTI-PORT VALVE DEVICE WITH DUAL DIRECTIONAL STRAINER

CROSS-REFERENCE TO RELATED APPLICATIONS

This application is related to and claims priority from earlier filed U.S. Provisional Patent Application No. 62/049,553, filed Sep. 12, 2014, the disclosure of which is incorporated herein by reference.

BACKGROUND OF THE INVENTION

1. Field of the Invention

The present invention generally relates to a valve device and method of use. More specifically, the present invention relates to a multi-port valve device with a dual directional strainer, which may be used for connecting an injection pump system to a tank.

2. Description of Related Art

Hydraulic fracturing is widely used in the oil and gas industry to enhance recovery of oil and natural gas. Commonly known as "fracking," hydraulic fracturing is the propagation of fractures in a rock layer by a pressurized fluid. Hydraulic fractures are formed by drilling wellbores into reservoir rock formations and injecting large volumes of fracking fluid, primarily consisting of water, under high pressure into the wellbores. The injected fluid creates fractures in the rock formations, allowing oil or natural gas to flow from the formations to the wellbores.

From limiting the growth of bacteria to preventing corrosion of the well casing, hydraulic fracturing fluids are needed to insure that the fracturing job is efficiently and effectively performed. Undiluted hydraulic fracturing fluids are initially stored in tanks. The fluids are then injected into water at a selected rate using an injection pump system. Design problems in current systems used for connecting an injection pump system to a tank present several disadvantages that are overcome by the present invention.

Current systems utilize multiple pipe fittings to fluidly connect a tank to an injection pump and to a gauge for measuring the injection rate of the injection pump. Such pipe fittings are not specifically made for connecting a tank to an injection pump and to a gauge, and as a result, present several disadvantages.

One problem with current systems is that such systems do not provide a means to simultaneously filter the fluids flowing from the tank to the injection pump and flowing from the tank to the gauge. Such fluids often include particulates, dirt, and other unwanted materials that can clog or damage both the injection pump and the gauge.

Another problem with current systems is that the assembly of such systems is time-consuming and labor intensive. The pipe fittings currently utilized have threaded ends (i.e., ends having internal female threads or external male threads) for assembling the fittings together in various configurations. Therefore, much time and effort is spent trying to properly thread the various pipe fittings together in an effort to make leak-proof, reliable connections between the fittings.

A further problem with current systems is that each threaded connection point between the pipe fittings is a potential leak path. Ideally, when threading the fittings together, internal female threads mate with external male threads to form an impenetrable barrier against fluids. In reality, complete metal-to-metal contact between the male and female threads is extremely difficult to achieve and any minute spaces left in between the threads become leak paths. This is a serious problem faced by the oil and gas industry as surface leaks of undiluted fluids used in hydraulic fracturing result in waste of expensive fluids and pose great risks to the environment and human health.

Another problem with current systems is the unnecessary stress placed upon tanks due to the use of heavy pipe fittings designed to handle pressurized fluids. Pipe fittings designed to handle pressurized fluids are not required for connecting an injection pump to a tank because the fluids flowing from the tank to the injection pump are not pressurized. The fluids do not become pressurized until after the fluids flow through the injection pump. Therefore, current pipe fittings have thicker and sturdier walls and, thus, weigh more than required for handling non-pressurized fluids, such as the fluids flowing from the tank to the injection pump. As a result of the added weight and stress placed upon tanks by current systems, current systems decrease the life span of tanks.

Currently, a valve device with a dual directional strainer is needed to prevent particulates from flowing through and damaging injection pumps and gauges. A one-piece device is needed to reduce the number of pipe fittings, threaded connection points, and leak paths between the tank and the injection system. Furthermore, in order to decrease the labor costs associated with assembling current systems, a device is needed that provides for a quick and efficient method of connecting an injection pump to a tank by eliminating the time spent threading pipe fittings together. A device having fewer leak paths is needed in order to decrease the waste, cost, environmental risks, and human health risks associated with leaks of hydraulic fracturing fluids. Finally, a device is needed that is compact and relatively lightweight in order to decrease the stress put on tanks by the heavy pipe fittings currently used, thereby increasing the life span of tanks.

In view of the foregoing, it is apparent that a need exists in the art for a valve device which overcomes, mitigates or solves the above problems in the art. It is a purpose of this invention to fulfill this and other needs in the art which will become more apparent to the skilled artisan once given the following disclosure.

OBJECTS AND SUMMARY OF THE INVENTION

It is an object of the present invention to overcome the above described drawbacks associated with current devices. To achieve these and other advantages and in accordance with the purpose of the invention, as embodied and broadly described, the present disclosure describes a multi-port valve device with dual directional strainer, which may be used for connecting a tank to an injection pump and to a gauge.

Unlike existing systems which are not specifically made for connecting a tank to an injection pump and to a gauge, the disclosed device is specifically configured to connect a tank to an injection pump and to a gauge. One important advantage provided by the disclosed device is that it provides a dual directional strainer that is arranged and configured to filter fluids flowing from a tank to an injection pump in a first direction and to filter fluids flowing from the tank to a gauge in a second direction, which is opposite the first direction.

The device disclosed herein includes a novel one-piece valve device. By utilizing this one-piece device, the disclosed device provides a device having a reduced number of fittings, a reduced number of threaded connection points, and a reduced number of leak paths. This configuration provides many advantages over current assemblies used to connect an injection system to a tank. Unlike existing systems used to connect an injection system to a tank, the present device is not comprised of multiple threaded pipe fittings that must be threadably connected to one another at the work site. The present device provides for a quick and easy installation method and saves time and labor costs by significantly reducing the number of threaded connection points between the tank and the injection system. Additionally, by eliminating many of the threaded connection points and leak paths, the configuration of the disclosed device greatly reduces the waste resulting from leaks of hydraulic fracturing fluids and decreases the environmental and human health risks associated with such leaks.

Furthermore, unlike current assemblies that utilize pipe fittings designed to handle pressurized fluids, the disclosed device is designed to handle the non-pressurized fluids flowing by gravity from the tank to the injection pump. Therefore, the disclosed device is designed to be more compact and has thinner walls and a reduced weight compared to current assemblies.

These, together with other objects of the invention, along with various features of novelty that characterize the invention, are pointed out with particularity in the drawings, detailed description, and claims annexed hereto and forming a part of this disclosure. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings.

DETAILED DESCRIPTION OF ILLUSTRATIVE EMBODIMENTS

The terms "top," "bottom," "front," and "rear" are used in the specification to describe the embodiments of the invention as illustrated in the accompanying Figures. It should be appreciated that in actual use, an embodiment of the invention may be rotated as needed to accomplish the objectives of the invention. As a result of such rotation, the various terms used herein of "top," "bottom," "front," "rear," and the like may not literally apply to a particular arrangement. Such terms are relative and are used herein to describe the Figures for illustration purposes only and are not intended to limit the embodiments shown to any particular orientation.

Referring now to FIGS. 1-9, exemplary embodiments of a multi-port valve device with dual directional strainer 10 in accordance with the present disclosure are illustrated. The valve device 10 is configured to fluidly connect a tank to an injection pump and to a gauge.

As illustrated in the accompanying Figures, the valve device 10 according to the present disclosure includes a body 11 including a cylindrical wall, the body 11 having a front face 24, a rear face 25, a top face 26, and a bottom face 27; a first arm 19 including a cylindrical wall, wherein the first arm 19 is attached to the rear face 25 of the body 11 and extends perpendicularly from the rear face 25 of the body 11; a second arm 20 including a substantially cylindrical wall, wherein the second arm 20 is attached to the bottom face 27 of the body 11 and extends obliquely from the bottom face 27 of the body 11; a fluid passageway 23 extending through the cylindrical walls of the first arm 19 and the body 11; and a strainer member 12 at least partially disposed within the second arm 20, the strainer member 12 being arranged and configured to strain fluids flowing through the fluid passageway 23 from the first arm 19 through the strainer member 12 and into the body 11 in a first direction and to strain fluids flowing from the first arm 19 through the strainer member 12 and into the body 11 in a second direction, the second direction being opposite of the first direction.

As depicted in the accompanying Figures, the second arm 20 of the disclosed device 10 is attached to the bottom face 27 of the body 11 and extends obliquely from the bottom face 27 of the body 11. The second arm 20 comprises a substantially cylindrical wall and a second arm outlet 30 for removing the strainer member 12 disposed within the second arm 20. The strainer member 12, which is at least partially disposed within the second arm 20 of the device 10, extends through the second arm 20 into the body 11 at the location indicated at 17. The strainer member 12 is arranged and configured to strain fluids flowing through the fluid passageway 23 from the first arm 19 through the body 11 in a first direction toward the first end 21 of the device 10, which in operation may be connected to an injection pump. At the same time, the strainer member 12 is also arranged and configured to strain fluids flowing through the fluid passageway 23 from the first arm 19 through the body 11 in a second direction toward the second end 22 of the device 10, which in operation may be connected to a gauge. In this manner the disclosed device 10 provides a dual directional strainer member 12 that strains fluids flowing toward both the gauge and the injection pump.

Figure 1:
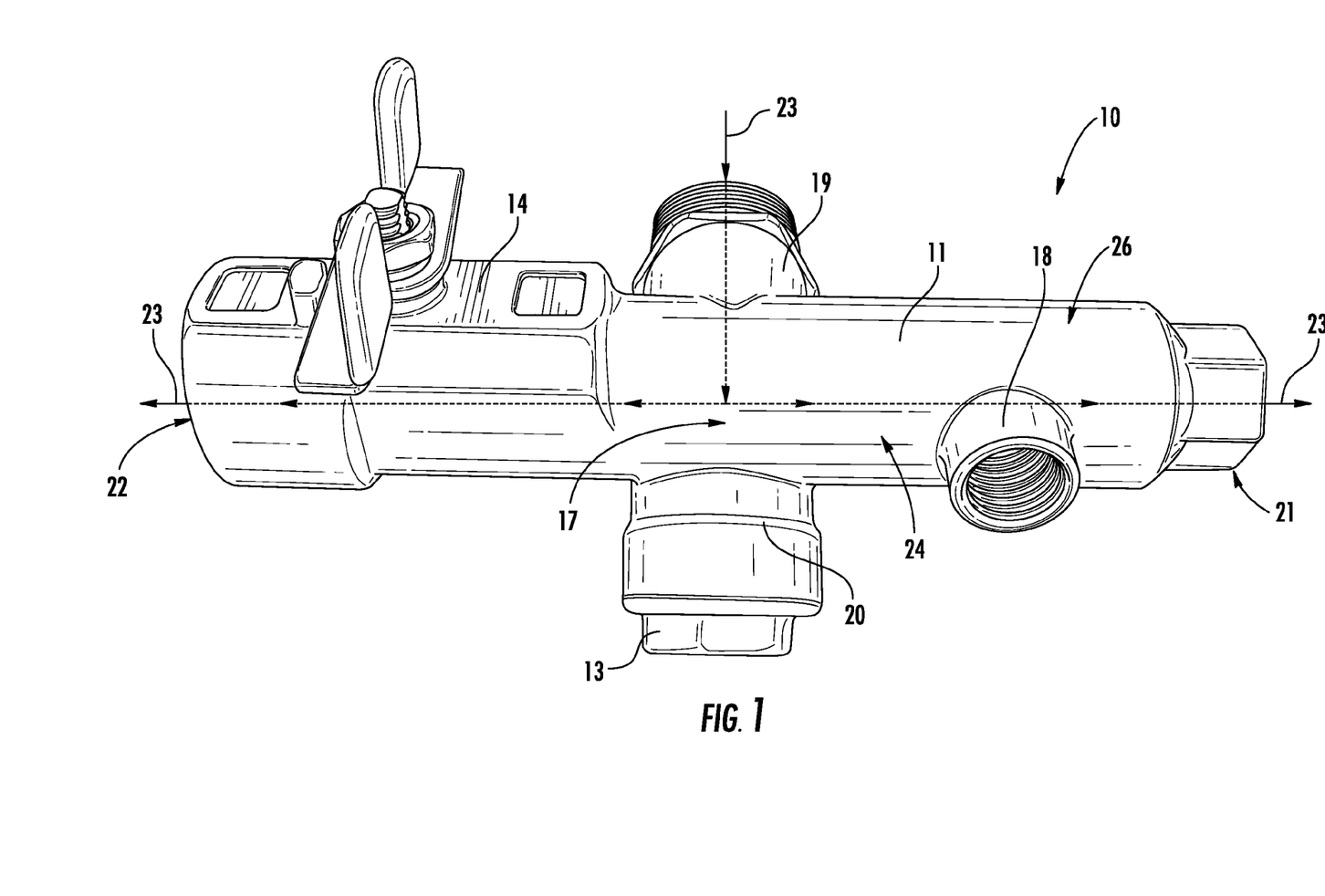
FIG. 1 is a front perspective view of a device constructed in accordance with the teachings of the present disclosure.
Figure 2:
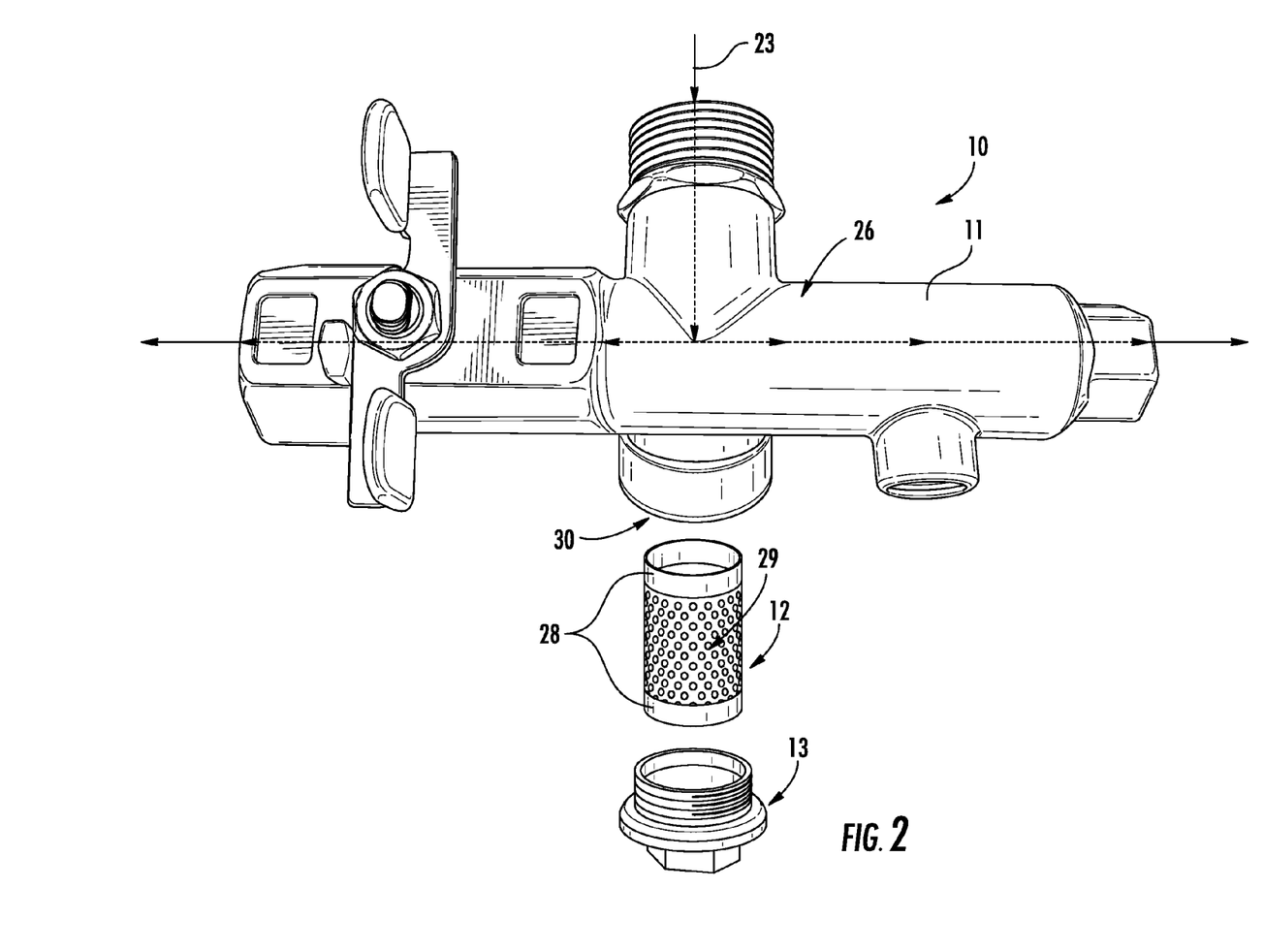
FIG. 2 is an exploded top perspective view of the device shown in FIG. 1.
Figure 3:
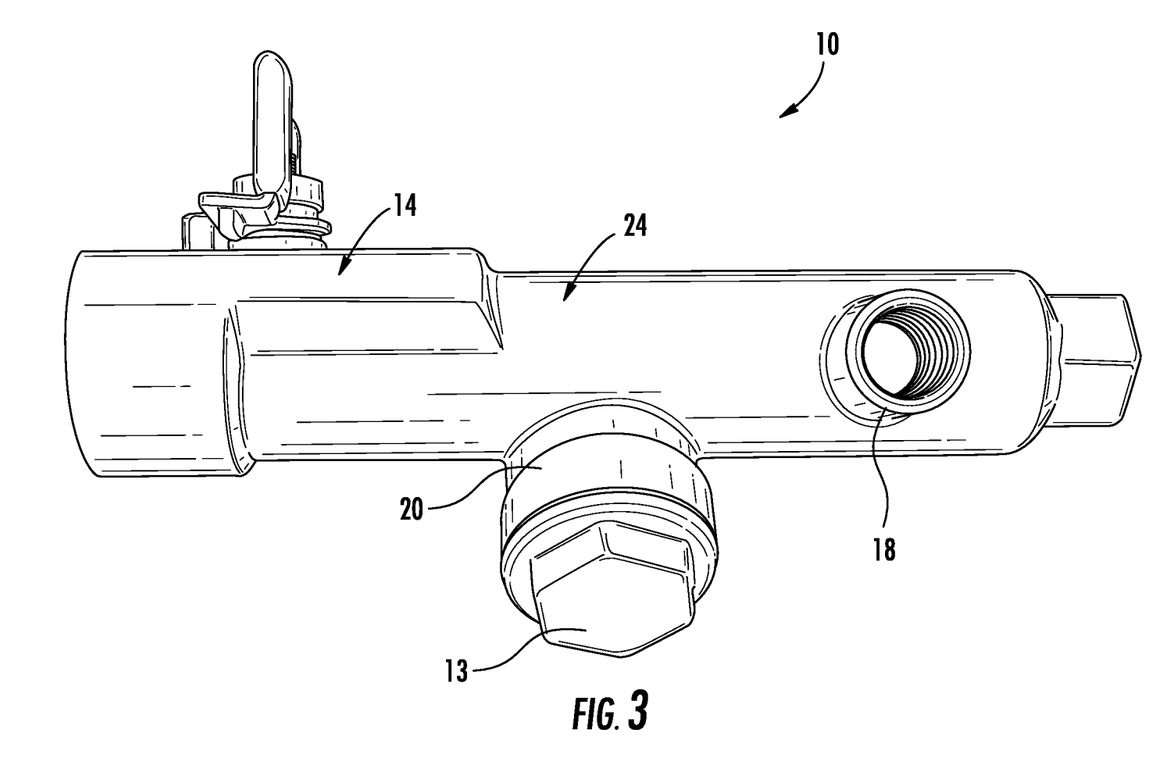
FIG. 3 is a front perspective view of the device shown in FIG. 1.

In the embodiment depicted in FIG. 2, the strainer member 12 includes a frame 28, on which is mounted one or more layers of mesh 29 or the like having openings of selected size adapted to pass fluids flowing through the device 10 while simultaneously filtering out particulates, dirt, and other unwanted material in the fluid traversing the strainer member 12. The strainer member 12 is used to remove particulates that could clog or damage the injection pump or the gauge. As fluid flows through the fluid passageway 23 toward the first end 21 of the device 10, the strainer member 12 catches and traps any particulates flowing with the fluid so that the fluid flowing through the first end 21 of the device 10 toward the injection pump is essentially particulate-free. Likewise, as fluid flows through the fluid passageway 23 toward the second end 22 of the device 10, the strainer member 12 catches and traps any particulates flowing with the fluid so that the fluid flowing through the second end 22 of the device 10 toward the gauge is essentially particulate-free. Over time, the strained particulates accumulate in the second arm 20. At any time, the particulates can be purged from the second arm 20 by removing a plug member 13 from the second arm 20. The plug member 13 releasably seals off the second arm outlet 30. This allows the accumulated particulates to be purged from the second arm 20 and it allows the strainer member 12 to be removed from the second arm outlet 30 for cleaning or replacement.

FIG. 2 shows one embodiment of a strainer member 12 that may be used with the disclosed device 10. The strainer member 12 may be cylindrical in shape, as illustrated, or it may be configured in any other shape suitable for fitting inside the second arm 20 and removing particulates from fluids flowing through the disclosed device 10. Those skilled in the art will recognize that many variations of strainer members may be utilized with the disclosed device 10, all of which are considered to be within the spirit and scope of the present invention.

As depicted in the attached Figures, the second arm 20 includes a plug member 13 for releasably sealing off the second arm outlet 30 to prevent fluids from flowing out through the second arm outlet 30. As shown in FIG. 2, the second arm 20 may include internal female threads for mating with external male threads on a plug member 13 threadably engaged with the second arm 20. An O-ring seal may be attached to the plug member 13 in order to better prevent leakage between the second arm 20 and the plug member 13. Alternatively, the second arm 20 may include external male threads for mating with internal female threads on a cap threadably engaged with the second arm 20. Additionally, other means for releasably sealing off the second arm outlet 30 may be used and are considered to be within the spirit and scope of the present invention.

The disclosed device 10 may further comprise one or more port members 18 configured for connecting the device 10 to an injection pump. At times, oil and gas operators may desire to inject fluids from two or more injection pumps using only one tank. The one or more port members 18 allow the disclosed device 10 to be used for such a task. If an operator only desires to inject fluids from one injection pump, the one or more port members 18, which are not being used, will be sealed off with a member (e.g., a plug) to prevent fluids from flowing through the one or more port members 18.

Figure 7:
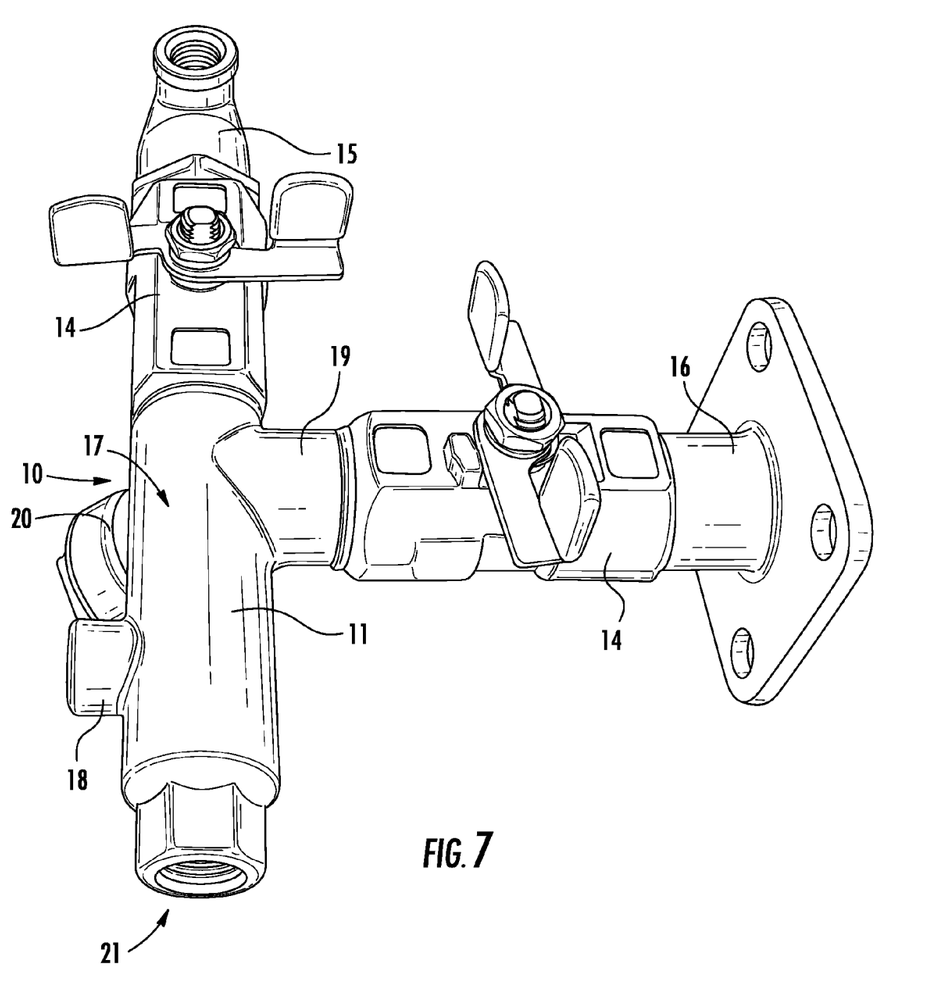
FIG. 7 is a side perspective view of a device constructed in accordance with the teachings of the present disclosure.
Figure 8:
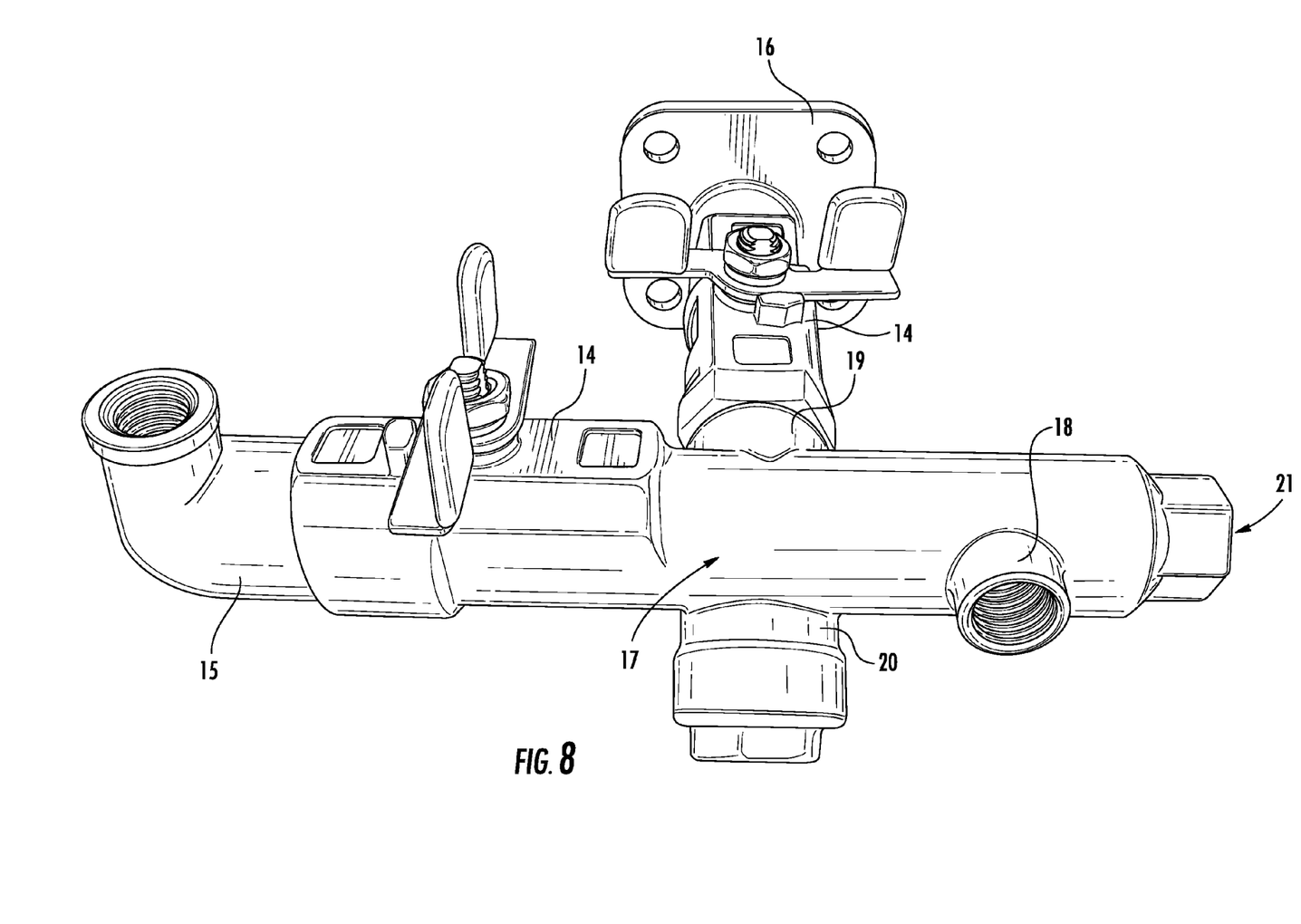
FIG. 8 is a front perspective view of the device shown in FIG. 7.
Figure 9:
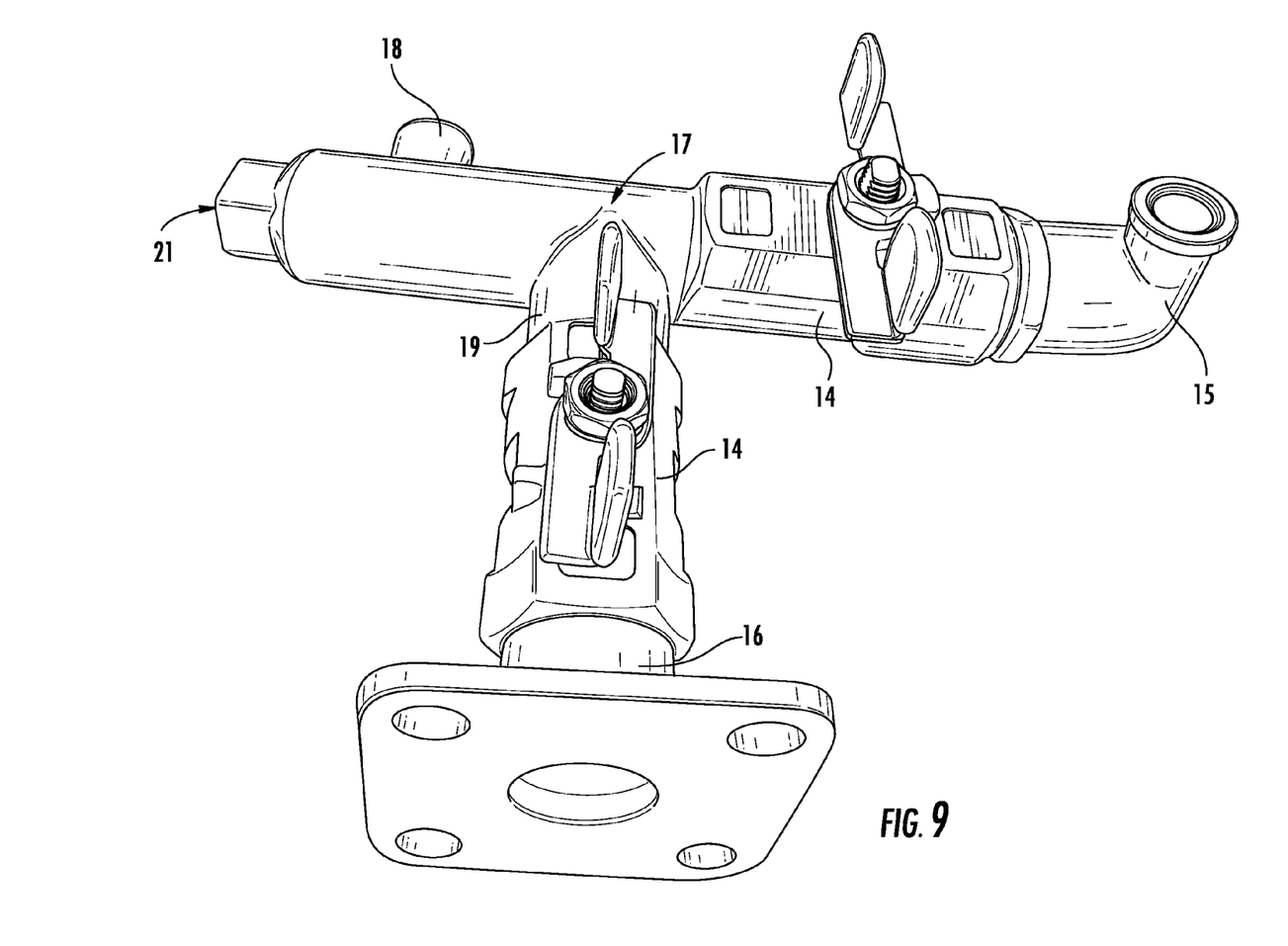
FIG. 9 is a rear perspective view of the device shown in FIG. 7.

As depicted in the accompanying Figures, the second end 22 of the disclosed device 10 may further include a valve member 14 (e.g., a quarter-turn ball valve or the like). As shown in FIGS. 7-9, the valve member 14 may be further connected to an elbow member 15. The elbow member 15 is configured to connect to a gauge (e.g., a pump setting gauge, a level gauge, or the like), which may be used to periodically monitor the performance and accuracy of an attached injection pump. As illustrated in FIGS. 7-9, the elbow member 15 may include a threaded end for threadably engaging a threaded coupling on the gauge, which is a standard part on gauges. Alternatively, the elbow member 15 may include any means for connecting the elbow member 15 to a gauge known by those skilled in the art.

In the embodiment depicted in FIGS. 7-9, the device 10 further includes a second valve member 14, such as a quarter-turn ball valve, attached to the first arm 19 of the device 10. The valve member 14 is further connected to a bulkhead fitting 16. The bulkhead fitting 16 allows the device 10 to easily be attached to a tank or the like.

Figure 4:
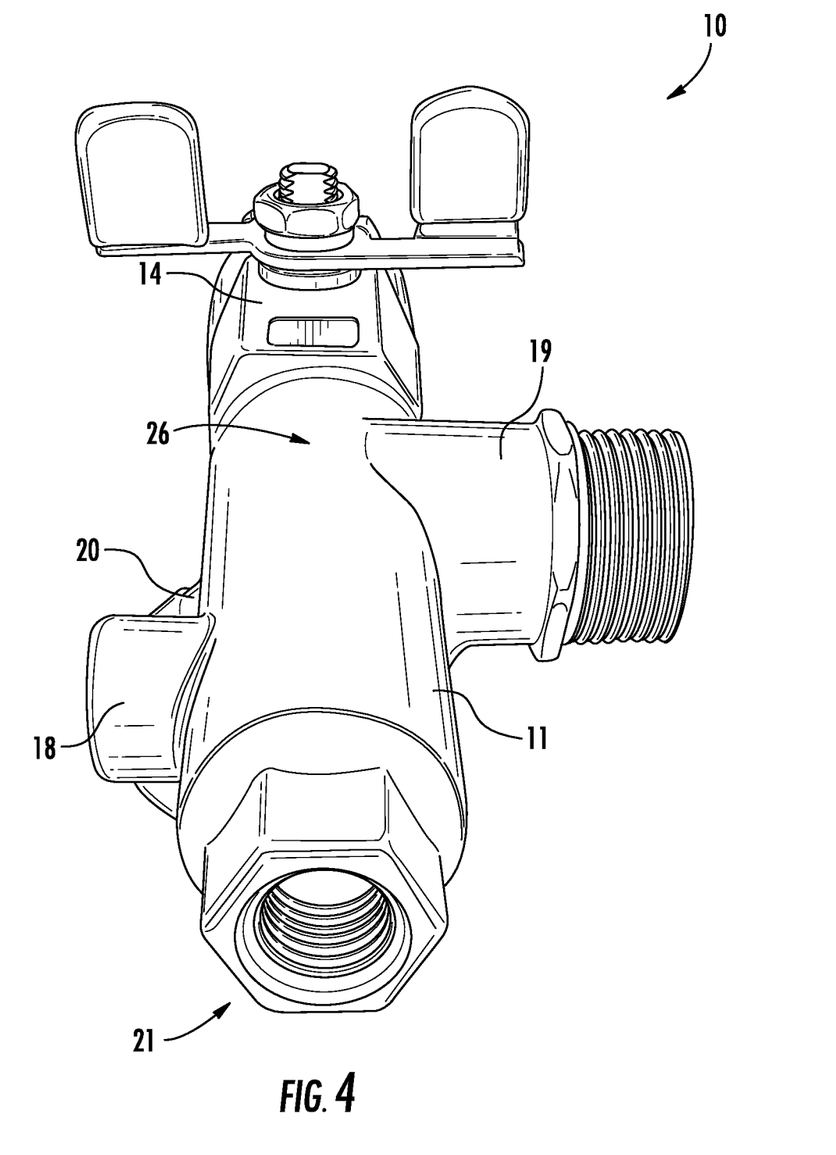
FIG. 4 is a side perspective view of the device shown in FIG. 1.
Figure 5:
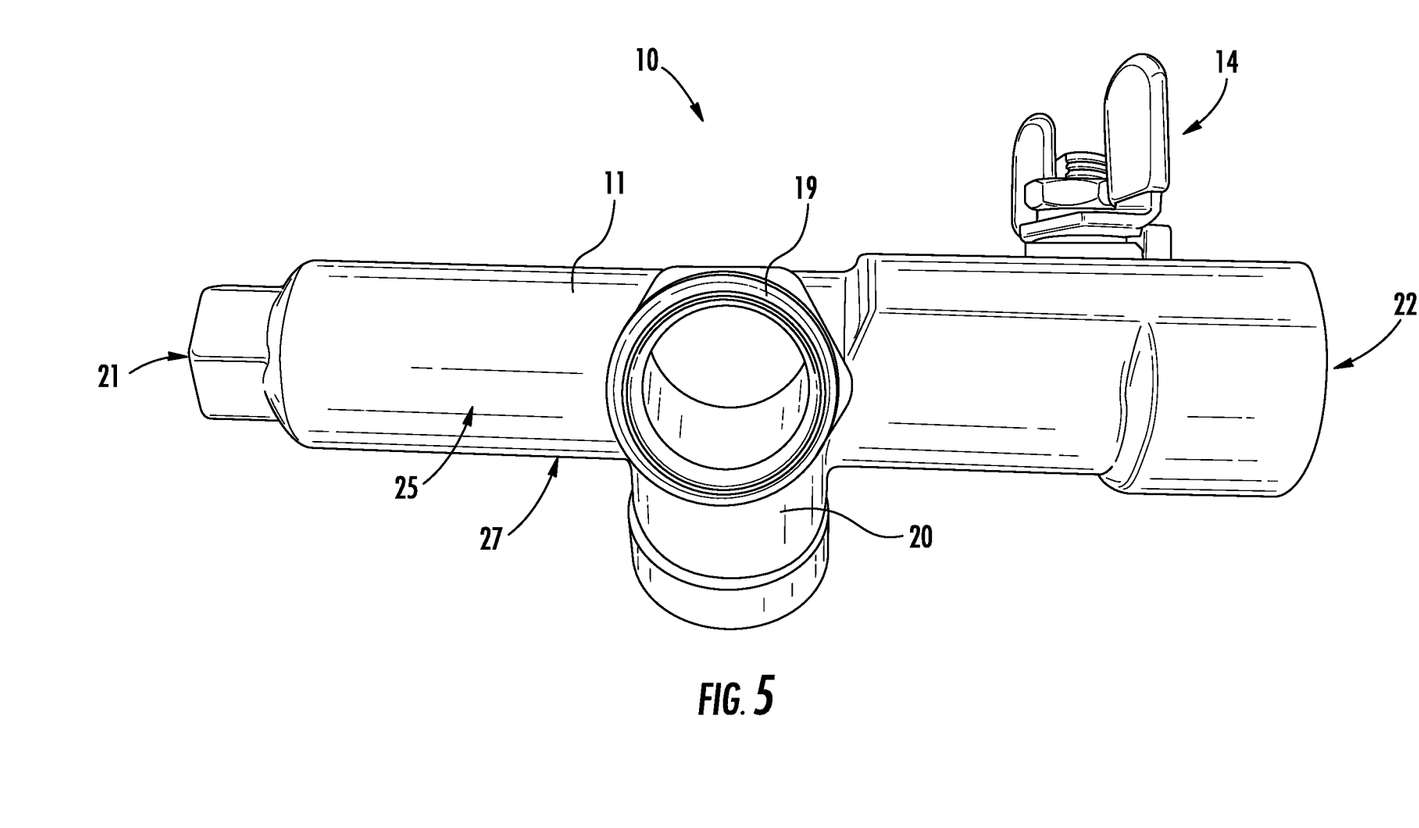
FIG. 5 is a rear perspective view of the device shown in FIG. 1.
Figure 6:
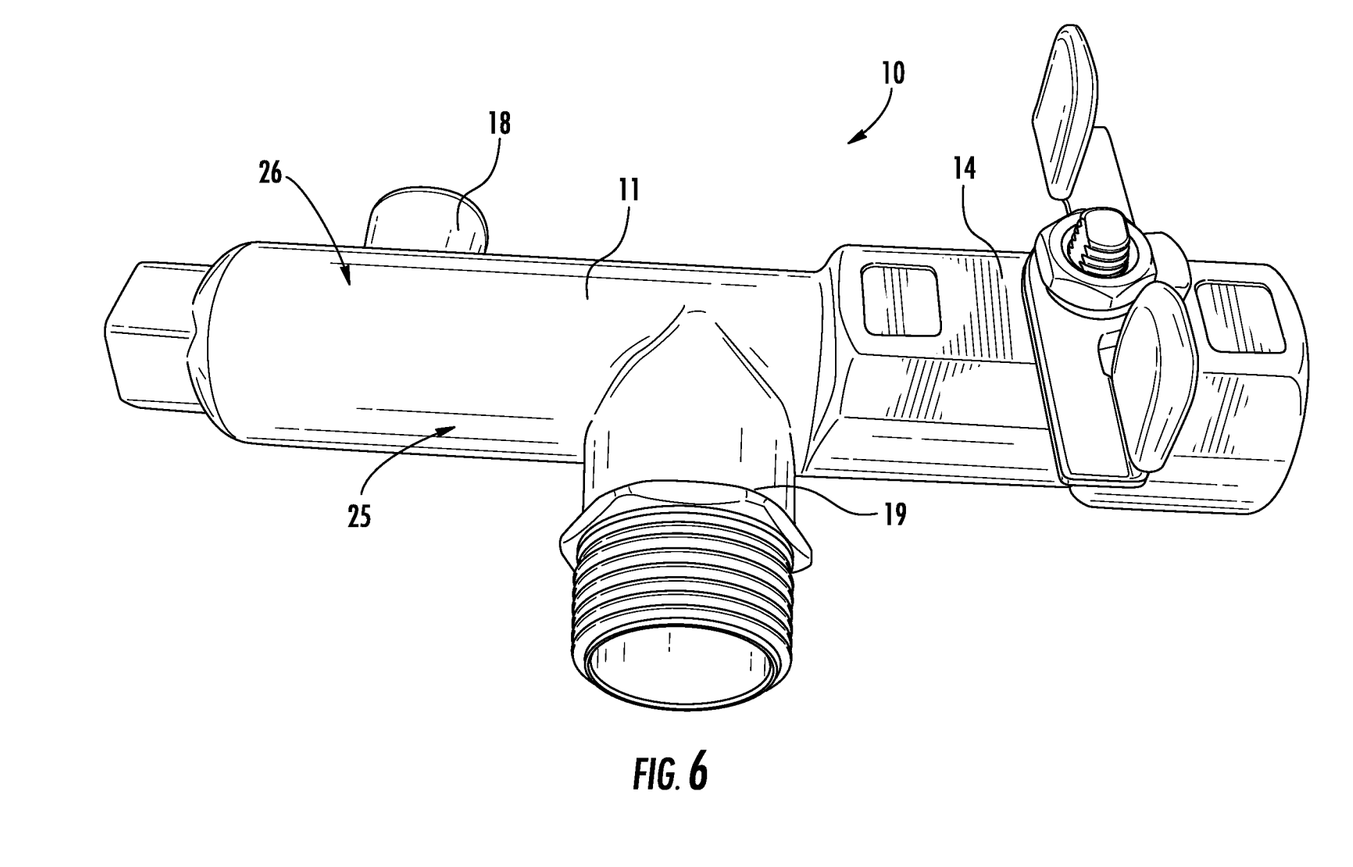
FIG. 6 is a rear perspective view of the device shown in FIG. 1.

As can be seen in FIGS. 4 and 7, the first end 21 of the device 10 includes a means (e.g., a threaded end) for connecting the device 10 to a hose fitting or the like. Once a hose fitting has been connected to the first end 21 of the device 10, a hose or the like is then connected to the hose fitting and an injection pump can be connected to the hose.

In one of the embodiments contemplated by the present disclosure, the cylindrical walls forming the body 11, the first arm 19, and the second arm 20 of the disclosed device 10, are thinner and are made with less material compared to the walls of conventional pipe fittings. For example, in one embodiment contemplated by the present disclosure, the walls are approximately 0.110 inches thick. In comparison, the walls of typical prior art fittings are at least 0.165 inches thick. Decreasing the thickness of the walls significantly reduces the weight of the device 10 and decreases production costs by reducing the amount of material used to make the device 10.

In another embodiment contemplated by the present disclosure, the disclosed device 10 is made of stainless steel. In alternative embodiments, the device 10 may be made of other materials suitable for handling hydraulic fracturing fluids and may be provided in various sizes suitable for connecting a tank to an injection pump and to a gauge as disclosed herein.

It is important to note that the construction and arrangement of the elements of the device provided herein are illustrative only. Although only a few exemplary embodiments of the present invention have been described in detail in this disclosure, those skilled in the art who review this disclosure will readily appreciate that many modifications are possible in these embodiments (such as variations in orientation of the components of the system, sizes, structures, shapes and proportions of the various components, etc.) without materially departing from the novel teachings and advantages of the invention.

Though the disclosed device is illustrated in the accompanying Figures and described with its application for use with tanks in the oil and gas industry, note that it is not intended to limit the spirit and scope of the present invention solely for use with tanks in the oil and gas industry. As will be appreciated by those skilled in the art, the disclosed device may be utilized in a wide range of industries and applications.

Many other uses of the present invention will become obvious to one skilled in the art upon acquiring a thorough understanding of the present invention. Once given the above disclosures, many other features, modifications and variations will become apparent to the skilled artisan in view of the teachings set forth herein. Such other uses, features, modifications and variations are, therefore, considered to be a part of this invention, the scope of which is to be determined by the following claims.

The invention claimed is:

1. A valve device for fluidly connecting a tank to an injection pump and to a gauge, said valve device comprising:
    a body including a cylindrical wall, said cylindrical wall having a front face, a rear face which faces opposite said front face, a top face, and a bottom face which faces opposite said top face, wherein said body further includes a first end and a second end on opposite ends of said body;
    a first arm including a cylindrical wall, wherein said first arm is attached to said rear face of said cylindrical wall of said body and extends perpendicularly from said rear face;
    a second arm including a substantially cylindrical wall, wherein said second arm is attached to said bottom face of said cylindrical wall of said body and extends obliquely from said bottom face;
    a fluid passageway extending through said cylindrical walls of said first arm and said body; and
    a strainer member at least partially disposed within said second arm, said strainer member being arranged and configured to strain fluids flowing through said fluid passageway from said first arm through said strainer member and into said body in a first direction toward said first end of said body, and said strainer member being arranged and configured to strain fluids flowing through said fluid passageway from said first arm through said strainer member and into said body in a second direction toward said second end of said body, said second direction being opposite of said first direction.

2. The device according to claim 1, wherein said second arm comprises a second arm outlet for removing said strainer member disposed within said second arm.

3. The device according to claim 2, wherein said second arm further includes a plug member that releasably seals off said second arm outlet.

4. The device according to claim 3, wherein said second arm includes internal female threads and said plug member includes external male threads configured to mate with said internal female threads.

5. The device according to claim 2, further comprising a cap that releasably seals off said second arm outlet, wherein said second arm includes external male threads and said cap includes internal female threads configured to mate with said external male threads.

6. The device according to claim 1, wherein said first end is connected to said injection pump and said second end is connected to said gauge, and wherein said strainer member is arranged and configured to simultaneously strain fluids flowing in said first direction towards said injection pump and to strain fluids flowing in said second direction towards said gauge.

7. The device according to claim 6, wherein said second end includes a first valve member.

8. The device according to claim 7, wherein said first valve member is attached to an elbow member, and wherein said elbow member is configured to attach to said gauge.

9. The device according to claim 7, further comprising a second valve member attached to said first arm of said device.

10. The device according to claim 9, wherein said first valve member and said second valve member are quarter-turn ball valves.

11. The device according to claim 9, wherein said second valve member is attached to a bulkhead fitting, said bulkhead fitting being configured to attach to said tank.

12. The device according to claim 1, wherein said strainer member comprises:
a frame; and
one or more layers of mesh mounted to said frame, said mesh having openings adapted to pass fluid flowing through said device while simultaneously filtering out particulates before the fluid flows through said injection pump and said gauge.

13. The device according to claim 1, further comprising one or more port members configured to connect said device to one or more additional injection pumps.

14. The device according to claim 1, wherein said walls forming said body, said first arm, and said second arm are less than 0.165 inches thick.

15. The device according to claim 1, wherein said walls forming said body, said first arm, and said second arm are 0.110 inches thick.

16. A valve device for fluidly connecting a tank to an injection pump and to a gauge, said valve device comprising:
a body including a cylindrical wall, said cylindrical wall having a front face, a rear face which faces opposite said front face, a top face, and a bottom face which faces opposite said top face, wherein said body further includes a first end for connection to said injection pump and a second end for connection to said gauge, said first end and said second end being on opposite ends of said body;
a first arm including a cylindrical wall, wherein said first arm is attached to said rear face of said cylindrical wall of said body and extends perpendicularly from said rear face;
a second arm including a substantially cylindrical wall, wherein said second arm is attached to said bottom face of said cylindrical wall of said body and extends obliquely from said bottom face;
a fluid passageway extending through said cylindrical walls of said first arm and said body; and
a strainer member at least partially disposed within said second arm, said strainer member being arranged and configured to strain fluids flowing through said fluid passageway from said first arm through said strainer member and into said body in a first direction toward said first end of said body, and said strainer member being arranged and configured to strain fluids flowing through said fluid passageway from said first arm through said strainer member and into said body in a second direction toward said second end of said body, said second direction being opposite of said first direction.

17. A valve device for fluidly connecting a tank to an injection pump and to a gauge, said valve device comprising:
a body including a cylindrical wall, said cylindrical wall having a front face, a rear face which faces opposite said front face, a top face, and a bottom face which faces opposite said top face, wherein said body further includes a first end and a second end on opposite ends of said body;
a first arm including a cylindrical wall, wherein said first arm is attached to said rear face of said cylindrical wall of said body and extends perpendicularly from said rear face;
a second arm including a substantially cylindrical wall, wherein said second arm is attached to said bottom face of said cylindrical wall of said body and extends obliquely from said bottom face, and wherein said second arm is arranged and configured with said first arm to form an angle that ranges from 95 degrees to 175 degrees;
a fluid passageway extending through said cylindrical walls of said first arm and said body; and
a strainer member at least partially disposed within said second arm, said strainer member being arranged and configured to strain fluids flowing through said fluid passageway from said first arm through said strainer member and into said body in a first direction toward said first end of said body, and said strainer member being arranged and configured to strain fluids flowing through said fluid passageway from said first arm through said strainer member and into said body in a second direction toward said second end of said body, said second direction being opposite of said first direction.

* * * * *